(12) United States Patent
Bernauer et al.

(10) Patent No.: US 10,461,807 B2
(45) Date of Patent: Oct. 29, 2019

(54) POWER AND DATA TRANSMISSION SYSTEM AND METHOD

(71) Applicant: PHILIP MORRIS PRODUCTS S.A., Neuchatel (CH)

(72) Inventors: Dominique Bernauer, Neuchatel (CH); Felix Fernando, Old Basing (GB)

(73) Assignee: Philip Morris Products S.A., Neuchatel (CH)

( * ) Notice: Subject to any disclaimer, the term of this patent is extended or adjusted under 35 U.S.C. 154(b) by 16 days.

(21) Appl. No.: 15/303,136

(22) PCT Filed: Mar. 17, 2015

(86) PCT No.: PCT/EP2015/055561
§ 371 (c)(1),
(2) Date: Oct. 10, 2016

(87) PCT Pub. No.: WO2015/158482
PCT Pub. Date: Oct. 22, 2015

(65) Prior Publication Data
US 2017/0033836 A1 Feb. 2, 2017

(30) Foreign Application Priority Data

Apr. 14, 2014 (EP) .................................... 14164642

(51) Int. Cl.
*H04B 3/54* (2006.01)
*A24F 47/00* (2006.01)
*H05B 1/02* (2006.01)

(52) U.S. Cl.
CPC ............. *H04B 3/54* (2013.01); *A24F 47/008* (2013.01); *H05B 1/0244* (2013.01); *H05B 2203/021* (2013.01)

(58) Field of Classification Search
CPC . A61M 15/06; A61M 2205/3389; H04B 3/54; A24F 47/008
(Continued)

(56) References Cited

U.S. PATENT DOCUMENTS 4,859,873 A 8/1989 O'Shaughnessy et al.
5,388,594 A * 2/1995 Counts .................. A24F 47/008
128/202.21

(Continued)

FOREIGN PATENT DOCUMENTS

CA 2 862 769 A1 7/2013
CN 201044608 Y 4/2008
(Continued)

OTHER PUBLICATIONS

International Search Report and Written Opinion dated May 13, 2015 in PCT/EP2015/055561 filed Mar. 17, 2015.
(Continued)

Primary Examiner — Phong La
(74) Attorney, Agent, or Firm — Oblon, McClelland, Maier & Neustadt, L.L.P.

(57) ABSTRACT

There is provided a system for transmitting power and data from a host device to a receiver device over an electrical connection, including a host device configured to transmit power and data through an output, and configured to transmit the power through the output at different times to the data; a receiver device having an input connectable to the output of the host device, the receiver device including a power receiving circuit, a data receiving circuit, and a switch element configured to connect the input to the power receiving circuit or the data receiving circuit dependent on a voltage of a signal received from the input. There is also provided a receiver device for receiving power and data from the host device.

20 Claims, 4 Drawing Sheets

(58) Field of Classification Search
USPC .......................................................... 370/498
See application file for complete search history.

(56) References Cited

U.S. PATENT DOCUMENTS

| | | | | |
|---|---|---|---|---|
| 5,934,289 A * | 8/1999 | Watkins | A24F 47/008 128/202.21 |
| 7,393,385 B1 * | 7/2008 | Coffey | B03C 3/383 95/59 |
| 2007/0063935 A1 * | 3/2007 | Yoshida | G09G 3/325 345/76 |
| 2009/0084771 A1 * | 4/2009 | Nomura | G05D 23/1913 219/263 |
| 2009/0230117 A1 * | 9/2009 | Fernando | A24F 47/008 219/490 |
| 2009/0320863 A1 | 12/2009 | Fernando et al. | |
| 2010/0212772 A1 * | 8/2010 | Allidieres | F17C 5/007 141/1 |
| 2011/0155718 A1 * | 6/2011 | Greim | A24F 47/008 219/507 |
| 2012/0280563 A1 | 11/2012 | Smith et al. | |
| 2013/0206154 A1 | 8/2013 | Fernando et al. | |
| 2013/0284192 A1 | 10/2013 | Peleg et al. | |
| 2014/0020693 A1 * | 1/2014 | Cochand | A61M 11/041 131/273 |
| 2014/0126922 A1 * | 5/2014 | Imahori | G03G 15/2039 399/33 |
| 2014/0345633 A1 * | 11/2014 | Talon | A24F 47/008 131/329 |
| 2014/0364844 A1 * | 12/2014 | Van Wyk | A61B 18/1477 606/37 |
| 2015/0007838 A1 | 1/2015 | Fernando et al. | |
| 2015/0013696 A1 * | 1/2015 | Plojoux | A61M 15/06 131/328 |
| 2015/0020832 A1 * | 1/2015 | Greim | A24F 47/008 131/329 |
| 2015/0230521 A1 * | 8/2015 | Talon | A24F 47/008 131/328 |
| 2017/0013882 A1 * | 1/2017 | Liu | A24F 47/008 |
| 2017/0188634 A1 * | 7/2017 | Plojoux | A24F 47/008 |

FOREIGN PATENT DOCUMENTS

| | | | |
|---|---|---|---|
| CN | 103365226 A | 10/2013 | |
| EP | 2 110 033 A1 | 10/2009 | |
| EP | 2 110 034 A1 | 10/2009 | |
| EP | 2110034 A1 * | 10/2009 | A24F 47/00 |
| EP | 2 253 233 A1 | 11/2010 | |
| JP | 2002-514910 A | 5/2002 | |
| JP | 2011-517567 A | 6/2011 | |
| JP | 2013-102594 A | 5/2013 | |
| RU | 2010 146 643 A | 5/2012 | |
| WO | WO 2009/127401 A1 | 10/2009 | |
| WO | 2013/098398 A2 | 7/2013 | |
| WO | WO 2013/0102612 A2 | 7/2013 | |
| WO | WO-2013098398 A2 * | 7/2013 | A24F 47/008 |

OTHER PUBLICATIONS

Combined Search Report and Written Opinion dated Sep. 28, 2017 in Singaporean Patent Application No. 11201607453U, 9 pages.
Office Action dated Nov. 12, 2018 in corresponding Japanese Patent Application No. 2016-562497 (with English Translation), 8 pages.
Taiwan Office Action with English translation dated Apr. 10, 2019 in corresponding Taiwanese Patent Application No. 104109758, (18 pages).
"BQ24190 I2C Controlled 4.5A Single Cell USB / Adaptor Charger | TI.com," available at http://www.ti.com/product/bq24190 and last accessed on Apr. 29, 2019 (6 pages).
Decision to Grant dated Oct. 23, 2018 in Russian Patent Application No. 2016144286 (submitting English language translation only).

* cited by examiner

POWER AND DATA TRANSMISSION SYSTEM AND METHOD

The disclosure relates to a system and method for allowing for the transmission of power and data over the single pair of wires or electrical contacts. In particular, the disclosure relates to the transmission of power and data from a charging device to a rechargeable device over a single pair of electrical contacts.

The use of a single pair of wires or lines to transmit both power and data is known in the art, using frequency multiplexing. Data is transmitted using high frequency transmission over the wire pair. A low-pass or high-pass filter is employed at the receiving end, allowing data transfer simultaneously with power transmission. However, this solution is not always desirable. In particular, when the receiving device needs to be small and inexpensive the requirement for low-pass or high-pass filters is undesirable. These components add additional expense to the device electronics and also take up space within the device.

It would be desirable to provide a system, device and method for receiving power and data over a single pair of electrical contacts that is inexpensive, compact and reliable.

In a first aspect of the disclosure there is provided a system for transmitting power and data from a host device to a receiver device over an electrical connection comprising:

a host device configured to transmit power and data through an output, the host device configured to transmit the power through the output at different times to the data; and a receiver device having an input connectable to the output of the host device, the receiver device comprising a power receiving circuit and a data receiving circuit and a switch element configured to connect the input to the power receiving circuit or the data receiving circuit dependent on a voltage of a signal received from the input.

The system employs "time-multiplexing", which is a cheaper and easier solution than frequency multiplexing and requires no additional filters. Furthermore, the system does not rely on dedicated time slots for power and data and so does not require synchronization between the host device and the receiver device. The receiver device determines when data is being received instead of power on the basis of one or more voltage determinations.

In a second aspect, there is provided a receiver device for receiving power and data from a host device comprising:

an input connectable to the host device;
a power receiving circuit;
a data receiving circuit; and
a switch element configured to connect the input to the power receiving circuit or the data receiving circuit dependent on a voltage of a signal received from the input.

The switch element may be configured to switch from a first state to a second state when the voltage at the input is above a first voltage threshold. The switch element may be configured to switch from the second state to the first state when the voltage at the input is below a second voltage threshold. The second voltage threshold may be lower than the first voltage threshold. Alternatively the second voltage threshold may equal to the first voltage threshold.

The first state may be connection to the data receiving circuit. The second state may be connection to the power receiving circuit. Alternatively, the first state may simply be disconnection to the power receiving circuit. In this case, the data receiving circuit may be connected to the input at all times. The data receiving circuit may then be configured to determine a voltage level corresponding to power transmission and discard data received during power transmission.

Alternatively, the first state may be connection to the data receiving circuit and the second state may be disconnection from the data receiving circuit. In this case, the power receiving circuit may be connected to the input at all times.

The second voltage threshold may be lower than the first voltage threshold. Alternatively the second voltage threshold may equal to the first voltage threshold.

The first and second voltage thresholds may be between 1 and 30 Volts and advantageously between 2 and 8 Volts. The first threshold is preferably about 4 Volts.

The data receiving circuit may be configured to determine logic levels in the data by comparing an input voltage with a third threshold voltage. The data receiving circuit may be configured to determine logic levels in the data by comparing an input voltage with the third voltage threshold when the input voltage is rising and to a fourth voltage threshold when the input voltage is falling.

The switch element may comprise a voltage comparator.

The receiver device may be a battery operated device. The receiver device may be a handheld device.

The receiver device may be an aerosol-generating device. The aerosol-generating device may be configured to receive an aerosol-forming substrate. The aerosol-generating device may be configured to heat or otherwise vapourise aerosol-forming substrate to generate an aerosol that can be delivered to a user. The aerosol-generating device may be an electrically operated smoking system. The aerosol-generating device is preferably a handheld aerosol-generating device that is comfortable for a user to hold between the fingers of a single hand. The aerosol-generating device may be substantially cylindrical in shape.

The length of the primary device may be between about 70 mm and 120 mm and the external diameter may be between about 10 mm and 20 mm.

The host device may be a battery charging device. The host device may itself be powered by a battery. The host device may be a battery pack, an accessory equipped with a battery, a USB enabled accessory, a USB or other type of AC adapter, a car charger/adapter, or a different type of power source or accessory. The host device may be configured to provide power to the receiver device as pulses of current. The current provided by the host device may be between 0 and 5 Amps.

In a third aspect, there is provided a method for receiving power and data from a host device at a receiver device having a power receiving circuit and a data receiving circuit over an electrical connection comprising:

receiving at a input an electrical signal from the host device; and performing a comparison of a voltage of the input signal received at the input with a threshold voltage; and connecting or disconnecting the input and the power receiving circuit or the data receiving circuit dependent on a result of the comparison.

The step of performing a comparison is advantageously performed continuously while the electrical signal is being received at the input. The electrical signal is advantageously a time multiplexed signal comprising both power and data.

The step of connecting or disconnecting may comprise switching the input from connection to one of the power receiving circuit and the data receiving circuit to the other of the power receiving circuit and the data receiving circuit. Alternatively, the step of connecting or disconnecting may comprise connecting or disconnecting the input and only one of the power receiving circuit and the data receiving circuit, while the other of the power receiving circuit and the data receiving circuit remains permanently connected to the input.

Embodiments of the invention will now be described in detail, by way of example only, with reference to the accompanying drawings, in which.

Figure 1:
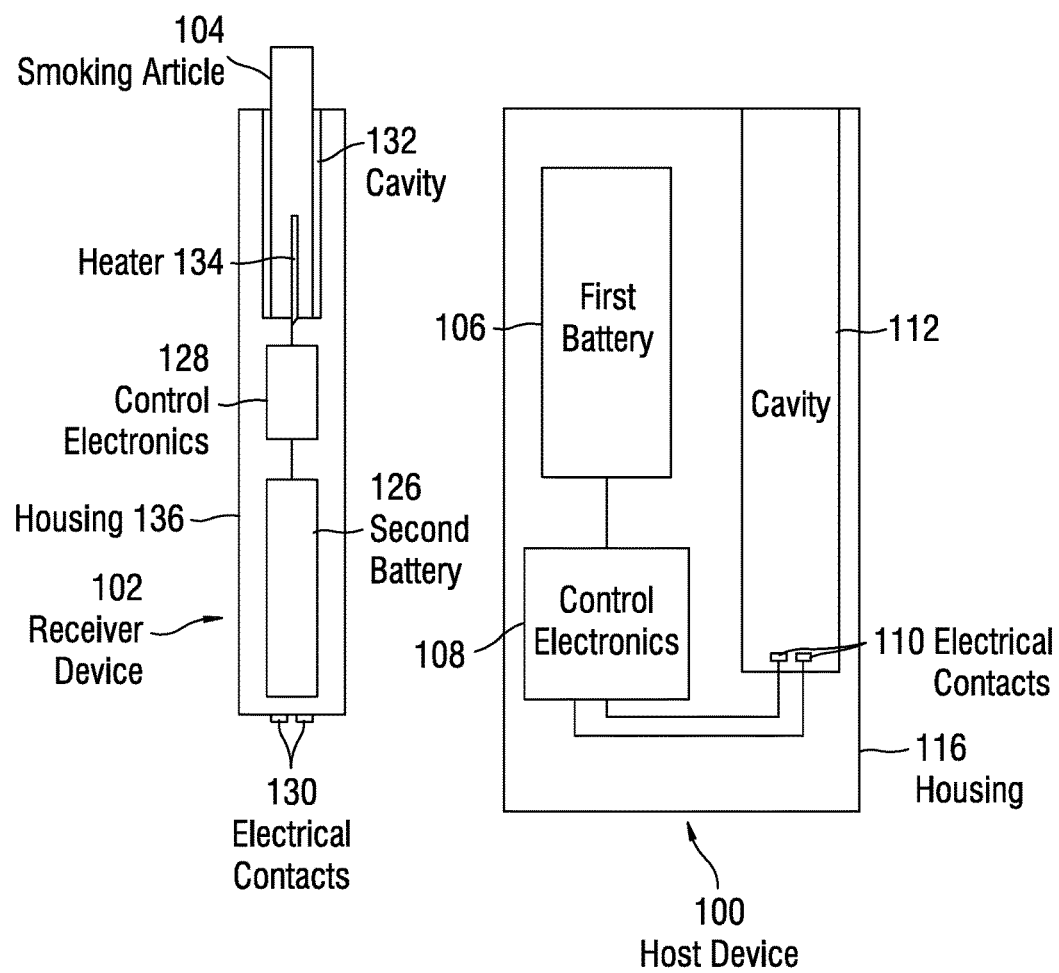
FIG. 1 is a schematic illustration of an electrically operated smoking system.

FIG. 1 shows a system comprising a host device 100 and a receiver device 102 in accordance with one embodiment of the invention. The host device 100 in this example is a charging unit for an electrically heated smoking system. The receiver device 102 in this example is an electrically heated aerosol-generating device adapted to receive a smoking article 104 comprising an aerosol-forming substrate. The receiver device includes a heater to heat the aerosol forming substrate in operation. The user inhales on a mouthpiece portion of the smoking article 104 to draw aerosol into the user's mouth. The receiver device 102 is configured to be received within a cavity 112 in the host device 100 in order to recharge the power supply in the receiver device.

The host device 100 comprises first battery 106, control electronics 108, and electrical contacts 110 configured to provide electrical power to a second battery in the receiver device and provide electrical data to electronics 128 in the receiver device, from the first battery 106, when the receiver device is in connection with the electrical contacts 110. The electrical contacts 110 are provided adjacent the bottom of a cavity 112. The cavity is configured to receive the receiver device 102. The components of the host device 100 are housed within the housing 116.

The receiver device 102 comprises a second battery 126, secondary control electronics 128 and electrical contacts 130. As described above, the receiver device 102 is configured to receive a supply of power and data from the host device when the electrical contacts 130 are in contact with the electrical contacts 110 of the host device 100. The receiver device 102 further comprises a cavity 132 configured to receive the smoking article 104. A heater 134, in the form of, for example, a blade heater, is provided at the bottom of the cavity 132. In use, the user activates the receiver device 102, and power is provided from the battery 126 via the control electronics 128 to the heater 134. The heater is heated to a standard operational temperature that is sufficient to generate an aerosol from the aerosol-forming substrate of the aerosol-generating article 104. The components of the receiver device 102 are housed within the housing 136. A receiver device of this type is described more fully in EP2110033 for example.

In this example, the receiver device 102 is an electrically heated smoking device. As such the receiver device 102 is small (conventional cigarette size) but must deliver high power over a period of just a few minutes, typically around 7 minutes for a single smoking session. The second battery may then need to be returned to the host device 100 for recharging.

In this example, the receiver device 102 has polygonal cross section. The external diameter of the receiver device may be between about 12.7 mm and about 13.65 mm measured from a flat face to an opposing flat face; between about 13.4 mm and about 14.2 mm measured from an edge to an opposing edge (that is, from the intersection of two faces on one side of the receiver device to a corresponding intersection on the other side); and between about 14.2 mm and about 15 mm measured from a top of the button to an opposing bottom flat face. The length of the receiver device is about 80 mm.

The first battery 106 in the host device is configured to hold sufficient charge to recharge the second battery 126 several times before needing recharging itself. This provides the user with a portable system that allows for several smoking sessions before recharging from a mains outlet is required.

In order to satisfy the competing requirements for the second battery 126 of small size, sufficient capacity and safe, but fast, charge and discharge, as well as acceptable lifetime, a lithium iron phosphate (LiFePO4) battery chemistry may be used, as in this example. The second battery 126 in this example has a cylindrical shape, with a diameter of 10 mm and a length of 37 mm. As an alternative, a lithium titanate battery may be used for the second battery.

The first battery 106 in the host device 100 is a lithium cobalt oxide (LiCoO2) battery of the prismatic type. A lithium cobalt oxide battery provides a higher battery voltage than lithium iron phosphate, allowing the charging of a lithium iron phosphate battery from a single lithium cobalt oxide battery.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco.

Alternatively, the aerosol-forming substrate may be a liquid substrate and the smoking article may comprise means for retaining the liquid substrate.

Figure 2:
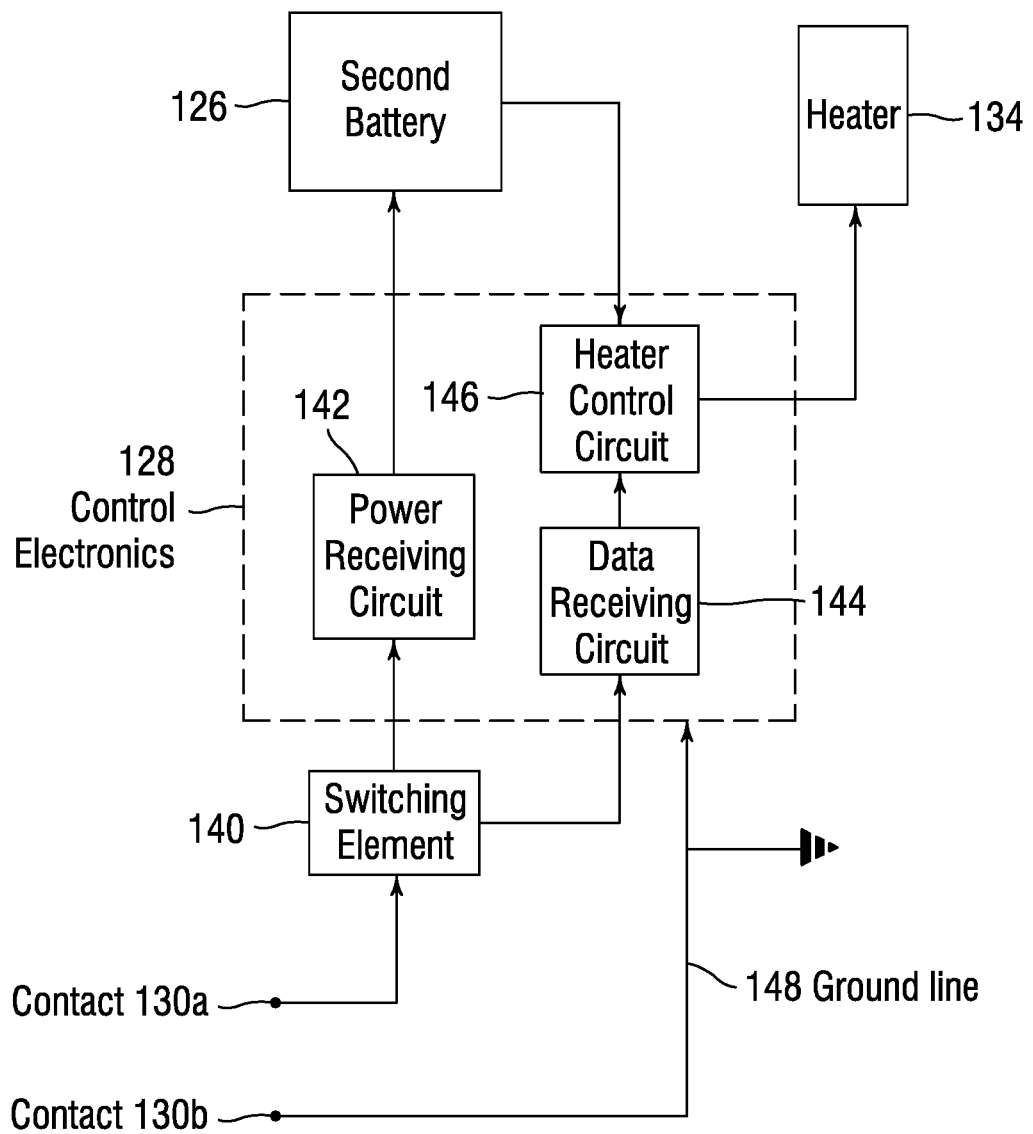
FIG. 2 is a schematic illustration of one configuration of the receiver device electronics in the system of FIG. 1.

FIG. 2 is a schematic illustration of the control electronics of the receiver device of FIG. 1. An electrical signal is received at contacts 130. Contact 130b is the ground connection and contact 130a is the signal connection. The input signal from 130 is received by switching element 140. The switching element is connected to both a power receiving circuit 142 and a data receiving circuit 144 with the receiver device electronics 128. The switching element is essentially a voltage comparator that changes its switching state dependent on the input voltage. Both the data receiving circuit 144 and the power receiving circuit 143 are connected to the ground line 148 which is connected to contact 130b.

The power receiving circuit 142 is connected to the device battery 126 to deliver the received power in accordance with a predetermined charging protocol. When the device is to be used to generate aerosol, subsequent to charging, the heater 134 is provided with power from the battery 126 through heater control circuit 146.

The data receiving circuit 144 passes received control data to the heater control circuit 146 as appropriate, for example to provide software updates. Data may be passed from the data receiving circuit to other elements of the device electronics such as the power receiving circuit 142, for example to confirm that the host device has been identified as a compatible device for use with the receiver device.

In use, when the host device is connected to the receiver device, the host device sends power and data to the receiver device through the contact 130*a*. Data may also be passed back from the receiver device to the host device through the contacts 130. The signal from the host device contains power and data in a sequential fashion, rather than simultaneously. However, it is not necessary for power transmission and data transmission to have dedicated time slots. At any given moment it may be power or data that is being transmitted. Instead the switch element 140 is able to determine, on the basis of a voltage comparison, whether power or data is being received at each moment in time.

Data is detected by the data receiving circuit by detecting voltage or current levels on its input. In this embodiment, the data receiving circuit 144 detect logic levels by comparing the input voltage to a Low Threshold 1 when the voltage is rising and a Low Threshold 2 when the voltage is falling. The data bit rate speed can be very high and may be in the range of 100 bits per second (100 bps) to 500 thousand bits per second (500 kbps).

Figure 3:
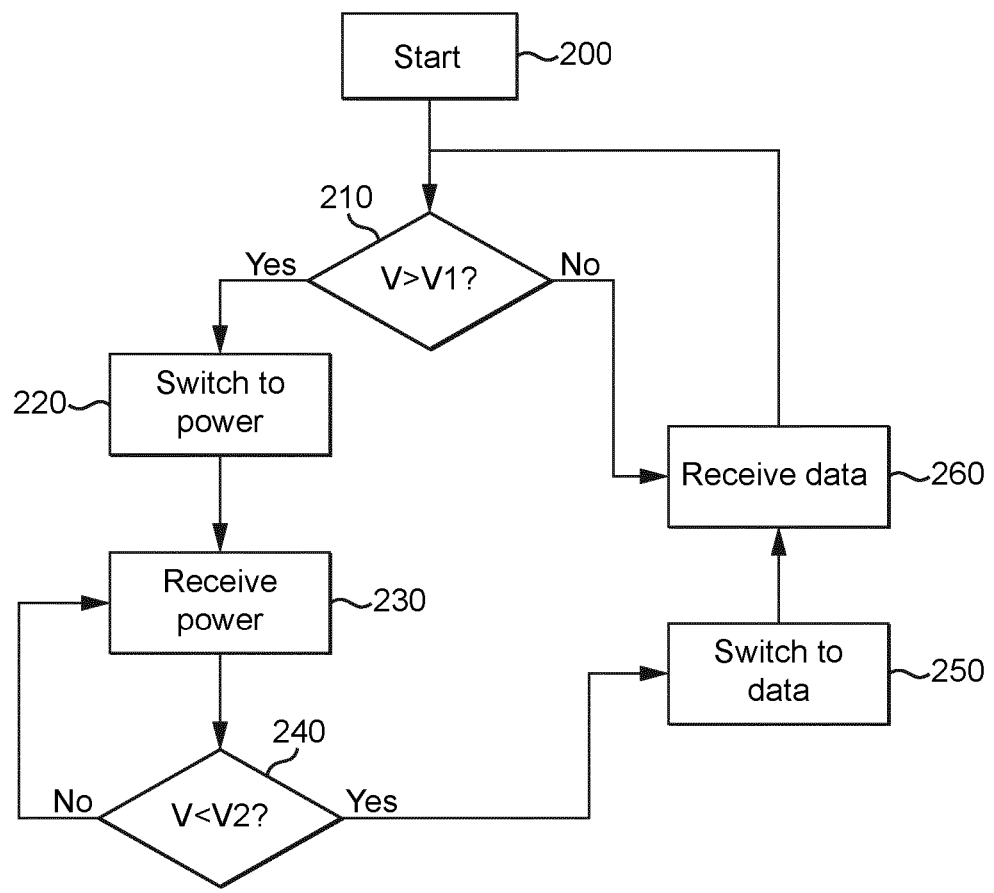
FIG. 3 is a flow diagram illustrating the operation of the switching element of FIG. 2.

FIG. 3 is a flow diagram illustrating the function of the switching element 140 shown in FIG. 2. When the receiver device is removed from the host device the switching element is configured to disconnect from the power receiving circuit. So in an initial state, indicated at start step 200, the switching element connects the input 130*a* to the data receiving circuit.

In step 210 the switching element compares the input voltage V with a first threshold voltage V1, which in this example is 4 Volts. If the input voltage is not greater than 4 Volts, then the switching element remains connected to the data receiving circuit and passes received data to the data receiving circuit in step 260, while continuously re comparing the input voltage with V1. If the input voltage is greater than 4 Volts the switching element switches state in step 220 to connect the input 130*a* with the power receiving circuit. In step 230, the switching element receives the power signal from the input and passes it to the power receiving circuit 142. When in this state, passing power to the power receiving circuit, the switching element continuously makes a comparison of the input voltage with a second voltage threshold V2, which in this example is 3.5 Volts. This is shown as step 240. If the voltage at the input drops below V2 then the switching element switches state in step 250 to connect the input 130*a* with the data receiving circuit. In step 260, the switching element receives the data signal from the input and passes it to the data receiving circuit 144. When in this state, passing data to the data receiving circuit, the switching element continuously makes a comparison of the input voltage with the first voltage threshold V1, as indicated by returning to step 210. If the input voltage is not greater than 4 Volts, then the switching element continues to pass data to the data receiving circuit in step 260. This switching behaviour is continuously maintained as long a signal is received at the input 130*a*. The current transmitted during power transmission may be as high as required for a particular charging protocol, but in this example is between 0 and 5 Amps.

Figure 4:
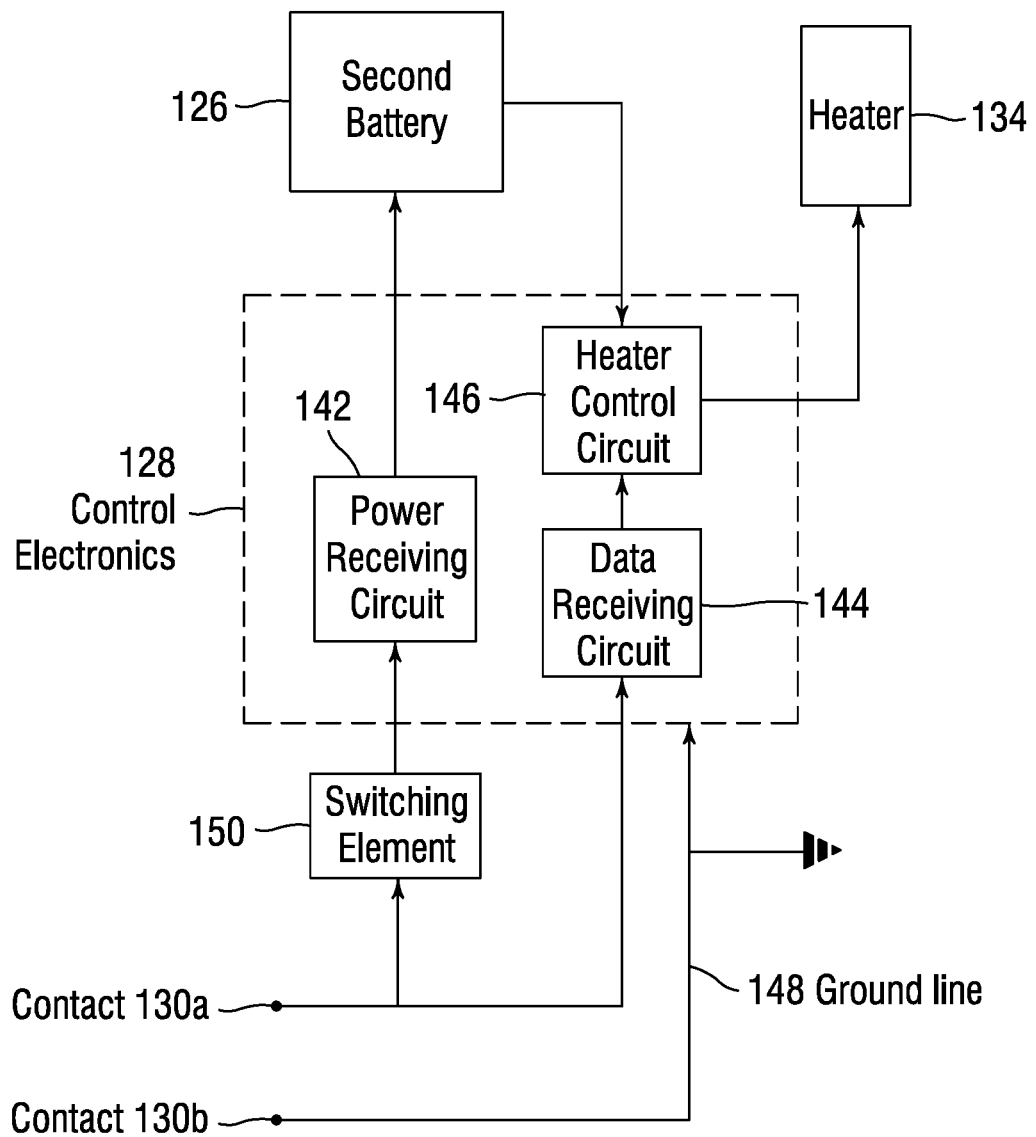
FIG. 4 is a schematic illustration of an alternative configuration of the receiver device electronics in the system of FIG. 1.

FIG. 4 illustrates an alternative arrangement for the switching element. In the embodiment shown in FIG. 4, the switching element 150 is not connected to the data receiving circuit 144 but only to the power receiving circuit 142. The data receiving circuit remains connected to the input 130*a* at all times. The switching element functions only to connect and disconnect the power receiving circuit 142 with the input 130*a* dependent on the input voltage. The same control strategy as described with reference to FIG. 3 can be used with this arrangement, but with step 250 being to disconnect from the power receiving circuit" rather than being to switch to the data receiving circuit.

The data receiving circuit of FIG. 4 is configured to withstand voltages applied by the host device when it is transmitting power. The data receiving circuit of FIG. 4 is configured to detect a voltage level corresponding to power transmission, using a voltage comparator, and discards data read during a power transmission phase.

Although the embodiments described refer only to data transfer from the host to the receiver device, it is of course possible for the receiver device to transmit data to the host over the same contacts. For example, it may be beneficial to transfer stored usage data, diagnostic data or battery related data to the host device.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A handheld, battery powered, electrically operated aerosol-generating device, comprising:
   an input comprising a single pair of electrical contacts connectable to a host device to receive a time-multiplexed signal from the host device, the time-multiplexed signal comprising power and data time-multiplexed with one another and solely being received by the single pair of electrical contacts;
   a power receiving circuit;
   a data receiving circuit; and
   a switch element configured to automatically and sequentially provide the time-multiplexed signal received at the input to the power receiving circuit such that the power receiving circuit receives the power in the time-multiplexed signal and to the data receiving circuit such that the data receiving circuit receives the data in the time-multiplexed signal, dependent on a voltage of the time-multiplexed signal.

2. The electrically operated aerosol-generating device according to claim 1, wherein the switch element is further configured to switch from a first state to a second state when the voltage of the time-multiplexed signal is above a first voltage threshold.

3. The electrically operated aerosol-generating device according to claim 2, wherein the switch element is further configured to switch from the second state to the first state when the voltage of the time-multiplexed signal is below a second voltage threshold.

4. The electrically operated aerosol-generating device according to claim 3, wherein the second voltage threshold is lower than the first voltage threshold.

5. The electrically operated aerosol-generating device according to claim 3, wherein the second state is a connection to the power receiving circuit.

6. The electrically operated aerosol-generating device according to claim 2, wherein the first state is a connection to the data receiving circuit.

7. The electrically operated aerosol-generating device according to claim 2, wherein the first state is a disconnection from the power receiving circuit.

8. The electrically operated aerosol-generating device according to claim 2, wherein the first voltage threshold is between 1 Volt and 30 Volts.

9. A system, comprising:
a host device comprising an output and configured to transmit through the output a time-multiplexed signal comprising power and time-multiplexed with one another; and
an electrically operated aerosol-generating device, comprising:
  an input connectable to receive the time-multiplexed signal from the output of the host device solely via a single pair of electrical contacts;
  a power receiving circuit;
  a data receiving circuit; and
  a switch element configured to automatically and sequentially provide the time-multiplexed signal to the power receiving circuit such that the power receiving circuit receives the power in the time-multiplexed signal and to the data receiving circuit such that the data receiving circuit receives the data in the time-multiplexed signal, dependent on a voltage of the time-multiplexed signal.

10. The system according to claim 9, wherein the switch element is further configured to switch from a first state to a second state when the voltage of the time-multiplexed signal is above a first voltage threshold.

11. The system according to claim 10, wherein the switch element is further configured to switch from the second state to the first state when the voltage of the time-multiplexed signal is below a second voltage threshold.

12. The system according to claim 11, wherein the second voltage threshold is lower than the first voltage threshold.

13. The system according to claim 11, wherein the second state is a connection to the power receiving circuit.

14. The system according to claim 11, wherein the data receiving circuit is configured to determine logic levels in the data by comparing the voltage of the time-multiplexed signal with a third threshold voltage.

15. The system according to claim 10, wherein the first state is a connection to the data receiving circuit.

16. The system according to claim 10, wherein the first state is a disconnection from the power receiving circuit.

17. The system according to claim 10, wherein the first voltage threshold is between 1 Volt and 30 Volts.

18. The system according to claim 9, wherein the host device comprises a battery charging device.

19. A method, comprising:
receiving a time-multiplexed signal comprising power and data time-multiplexed with one another from a host device solely at a single pair of electrical contacts of an electrically operated aerosol-generating device having a power receiving circuit and a data receiving circuit;
performing, by the device, a comparison of a voltage of the time-multiplexed signal with a threshold voltage; and
sequentially providing the time-multiplexed signal to the power receiving circuit and to the data receiving circuit dependent on a result of the comparison.

20. The method according to claim 19, wherein the performing the comparison is performed continuously while the time-multiplexed signal is being received at the single pair of electrical contacts.

* * * * *